United States Patent
Danley et al.

(10) Patent No.: US 12,246,654 B2
(45) Date of Patent: Mar. 11, 2025

(54) ADJUSTABLE HITCH MOUNT ASSEMBLY

(71) Applicant: Part Time Cloud, LLC, Palm Harbor, FL (US)

(72) Inventors: Paul Danley, Palm Harbor, FL (US); Joshua Paul Fassnacht, Tarpon Springs, FL (US)

(73) Assignee: PART TIME CLOUD, LLC, Palm Harbor, FL (US)

( * ) Notice: Subject to any disclaimer, the term of this patent is extended or adjusted under 35 U.S.C. 154(b) by 135 days.

(21) Appl. No.: 18/350,024

(22) Filed: Jul. 11, 2023

(65) Prior Publication Data

US 2024/0042944 A1    Feb. 8, 2024

Related U.S. Application Data

(60) Provisional application No. 63/394,680, filed on Aug. 3, 2022.

(51) Int. Cl.
*B60R 11/00* (2006.01)
*B60R 9/06* (2006.01)

(52) U.S. Cl.
CPC .......... *B60R 11/00* (2013.01); *B60R 9/06* (2013.01); *B60R 2011/004* (2013.01); *B60R 2011/005* (2013.01); *B60R 2011/0085* (2013.01)

(58) Field of Classification Search
CPC ...... B60R 2011/0085; B60R 9/06; B60D 1/44
USPC ............... 224/519, 509, 502, 506, 504, 505; D12/406; 280/462; 403/84, 104, 108
See application file for complete search history.

(56) References Cited

U.S. PATENT DOCUMENTS

| | | | | |
|---|---|---|---|---|
| 1,914,963 | A * | 6/1933 | Stephens | B60D 1/46 280/490.1 |
| 5,503,423 | A * | 4/1996 | Roberts | B60D 1/40 280/479.2 |
| 5,950,617 | A * | 9/1999 | Lorenz | B60R 9/06 126/25 R |
| 6,042,137 | A * | 3/2000 | McIntosh | B60D 1/46 280/490.1 |
| 6,607,002 | B2 * | 8/2003 | Reese | A45B 23/00 224/521 |
| 6,722,380 | B1 * | 4/2004 | Hafer | B60R 9/06 280/491.5 |
| 6,935,064 | B1 * | 8/2005 | Thompson | F41A 23/34 248/370 |
| 6,957,826 | B1 * | 10/2005 | MacKarvich | B60D 1/155 280/491.3 |

(Continued)

*Primary Examiner* — Justin M Larson
(74) *Attorney, Agent, or Firm* — Shumaker, Loop & Kendrick, LLP; Jeffrey B. Fabian

(57) ABSTRACT

An umbrella connection assembly for securing an umbrella to a vehicle hitch. The assembly includes a first arm coupled to the hitch and an end including opposing tabs, where each tab includes an axle pin aperture and a locking pin aperture. The assembly also includes a second arm having a protrusion at one end that is positioned between the opposing tabs, where the protrusion includes an axle pin aperture and a plurality of locking pin apertures. An axle pin is inserted in the axle pin apertures so that the second arm is rotatable relative to the first arm. A locking pin is inserted in the locking pin apertures so that the second arm is locked to the first arm. A third arm is coupled to an end of the second arm opposite to the protrusion so that the third arm is generally perpendicular to the second arm.

18 Claims, 8 Drawing Sheets

(56) References Cited

U.S. PATENT DOCUMENTS

| | | | | |
|---|---|---|---|---|
| 7,255,362 B2 * | 8/2007 | Smith | ................... | B60D 1/465 |
| | | | | 280/491.1 |
| D612,775 S * | 3/2010 | Davis | ........................... | D12/162 |
| 7,819,128 B2 * | 10/2010 | Clark | .................... | A45B 11/00 |
| | | | | 280/491.1 |
| 8,123,190 B2 * | 2/2012 | Kost | ....................... | G09F 21/04 |
| | | | | 248/514 |
| 8,474,852 B1 * | 7/2013 | Granados | ................. | B60D 1/36 |
| | | | | 280/479.2 |
| 8,485,207 B1 * | 7/2013 | Boyington | .............. | E04H 15/06 |
| | | | | 280/505 |
| 9,701,255 B2 * | 7/2017 | Brown | ...................... | B60R 9/10 |
| 10,099,524 B1 * | 10/2018 | Landry | .................... | B60D 1/07 |
| 11,155,323 B2 * | 10/2021 | Fournier | ................ | B63B 17/00 |
| 12,103,343 B1 * | 10/2024 | Rebick | ................... | B60R 3/007 |

\* cited by examiner

ADJUSTABLE HITCH MOUNT ASSEMBLY

TECHNICAL FIELD AND BACKGROUND

This disclosure relates generally to an adjustable connection assembly for securing various accessories to a vehicle hitch and, more particularly, to a connection assembly for securing an umbrella or other accessories to a vehicle hitch, where the connection assembly allows the accessories to be rotated through various orientations.

Some types of vehicles, such as trucks or sport utility vehicles, typically have a hitch to which a tongue associated with a towed object (e.g., a trailer) can be coupled so that the vehicle can tow the object. Outdoor work or recreational activities, such as tailgating, commonly involve the use of a vehicle with a hitch. These activities are often accompanied by exposure to sunlight and inclement weather (e.g., rain), and the activities entail the use of work or recreational equipment, such as toolboxes, coolers, or grills.

In particular, umbrellas are useful for blocking sunlight and rain and come in a variety of sizes. Some umbrellas are large and are intended to protect a group of people. These umbrellas are often fixed to a stand and are typically not moved as they may be cumbersome and heavy. To address the drawbacks of using large umbrellas, it would be advantageous to provide a connection assembly that can be coupled to a vehicle hitch and used to adjust the position of an umbrella. It would further be advantageous to provide a connection assembly configured to mount various accessories, including, without limitation, toolboxes, grills, coolers, and the like.

SUMMARY

The following discussion discloses and describes an umbrella connection assembly for securing accessories such as an umbrella to a vehicle hitch. The assembly has a first arm with one end that is shaped to be coupled to a hitch and a second end with a forked knuckle. The forked knuckle has opposing tabs with a space between the tabs. The tabs each have an axle pin aperture and a rotational locking pin aperture. The assembly has a second arm made up of a protrusion at one end that is positioned in the space between the opposing tabs of the forked knuckle. The protrusion has an axle pin aperture and a plurality of rotational locking pin apertures. An axle pin is inserted in the axle pin apertures in the tabs and the axle pin aperture in the protrusion so that the second arm is rotatable relative to the first arm. A rotational locking pin is inserted through the rotational locking pin apertures in the tabs and one of the rotational locking pin apertures in the protrusion when the rotational locking pin apertures in the tabs are aligned with one of the rotational locking pin apertures in the protrusion. When the rotational locking pin is inserted through the rotational locking pin apertures in the tabs and one of the rotational locking pin apertures in the protrusion, the second arm is locked into a given orientation relative to the first arm. The assembly has a third arm that is coupled to the end of the second arm that is opposite to the protrusion. The third arm (i) is generally perpendicular to the second arm, and (ii) is shaped to hold a post of an umbrella.

Additionally, the assembly's plurality of rotational locking pin apertures in the protrusion are arranged in a semicircle about the axle pin aperture. There can be at least five rotational locking pin apertures in the protrusion. Each rotational locking pin aperture in the protrusion is aligned at a given orientation relative to the locking pin apertures in the tabs when the protrusion is positioned in the space between the tabs. Moreover, the assembly's first arm and second arm are elongated tubular bodies with a squared cross section. The third arm is an elongated tubular arm with a circular cross section. Furthermore, the assembly's third arm has a post stop proximal to a lower end of the third arm, and the post stop supports the umbrella. The post stop comprises either a plate secured to the third arm or an elongated fastener that extends through the third arm. The first arm is able to receive a hitch pin. The second arm includes a hitch pin aperture able to hold the hitch pin when the assembly is not coupled to the vehicle. The first, second and third arms can be formed from aluminum.

In a second embodiment, the assembly has a first elongated tubular body having a first end and a second end opposite the first end. The second end has a forked knuckle, and the forked knuckle has opposing tabs that define a space between the tabs where each tab has a rotational locking pin aperture. A second elongated tubular body has a distal end and a coupling end. The coupling end has a protrusion and the protrusion is positioned in the space between the opposing tabs. The protrusion has a plurality of rotational locking pin apertures, and the second elongated tubular body is rotatable relative to the first elongated tubular body. The assembly also has a rotational locking pin that is adapted to be inserted through the rotational locking pin apertures in the tabs and one of the rotational locking pin apertures in the protrusion when the rotational locking pin apertures in the tabs are aligned with one of the rotational locking pin apertures in the protrusion. When the rotational locking pin is inserted through the rotational locking pin apertures in the tabs and the rotational locking pin aperture in the protrusion, the second elongated tubular body is locked into a given orientation relative to the first elongated tubular orientation. The assembly has a third elongated tubular body coupled to a distal end of the second elongated tubular body. The third elongated tubular body (i) is generally perpendicular to the second elongated tubular body, and (ii) is configured to receive a post of an umbrella.

Additionally, the assembly's plurality of rotational locking pin apertures in the protrusion are arranged in a semicircle about the axle pin aperture. There are at least five rotational locking pin apertures in the protrusion. Each rotational locking pin aperture in the protrusion is aligned at a given orientation relative to the locking pin apertures in the tabs when the protrusion is positioned in the space between the tabs. Moreover, the assembly's first elongated tubular body and the assembly's second elongated tubular body have a squared cross section. The assembly's third elongated tubular body has a circular cross section. Furthermore, the assembly's third arm has a post stop proximal to a lower end of the third arm, and the post stop is able to support the umbrella. The post stop has either a plate secured to the third arm or an elongated fastener that extends through the third arm. The first arm can receive a hitch pin. The second arm includes a hitch pin aperture to hold the hitch pin when the assembly is not coupled to the vehicle. The assembly's first, second and third arms are formed from aluminum.

In another embodiment, the assembly has a first arm with a first end operable to be coupled to a hitch and a second end with a forked knuckle. The forked knuckle has opposing tabs that define a space between the tabs, and the tabs each have an axle pin aperture and a rotational locking pin aperture. The assembly has a second arm with a protrusion at a coupling end. The protrusion is positioned in the space between the opposing tabs. The protrusion has an axle pin aperture and at least five rotational locking pin apertures.

The rotational locking pin apertures in the protrusion are arranged in a semicircle about the axle pin aperture, and each rotational locking pin aperture in the protrusion is aligned at a given orientation relative to the locking pin apertures in the tabs when the protrusion is positioned in the space between the tabs. The assembly has an axle pin inserted in the axle pin apertures in the tabs and the axle pin aperture in the protrusion so that the second arm is rotatable relative to the first arm. The assembly has a rotational locking pin that is adapted to be inserted through the rotational locking pin apertures in the tabs and one of the rotational locking pin apertures in the protrusion when the rotational locking pin apertures in the tabs are aligned with one of the rotational locking pin apertures in the protrusion, and when the rotational locking pin is inserted through the rotational locking pin apertures in the tabs and the rotational locking pin aperture in the protrusion, the second arm is locked into a given orientation relative to the first arm. The assembly has a third arm coupled to a distal end of the second arm opposite to the protrusion, wherein the third arm (i) is generally perpendicular to the second arm, and (ii) is configured to receive a post of an umbrella.

BRIEF DESCRIPTION OF THE DRAWINGS

Additional features of the disclosure will become apparent from the following description and appended claims, taken in conjunction with the accompanying drawings.

DETAILED DESCRIPTION

Figure 1A:
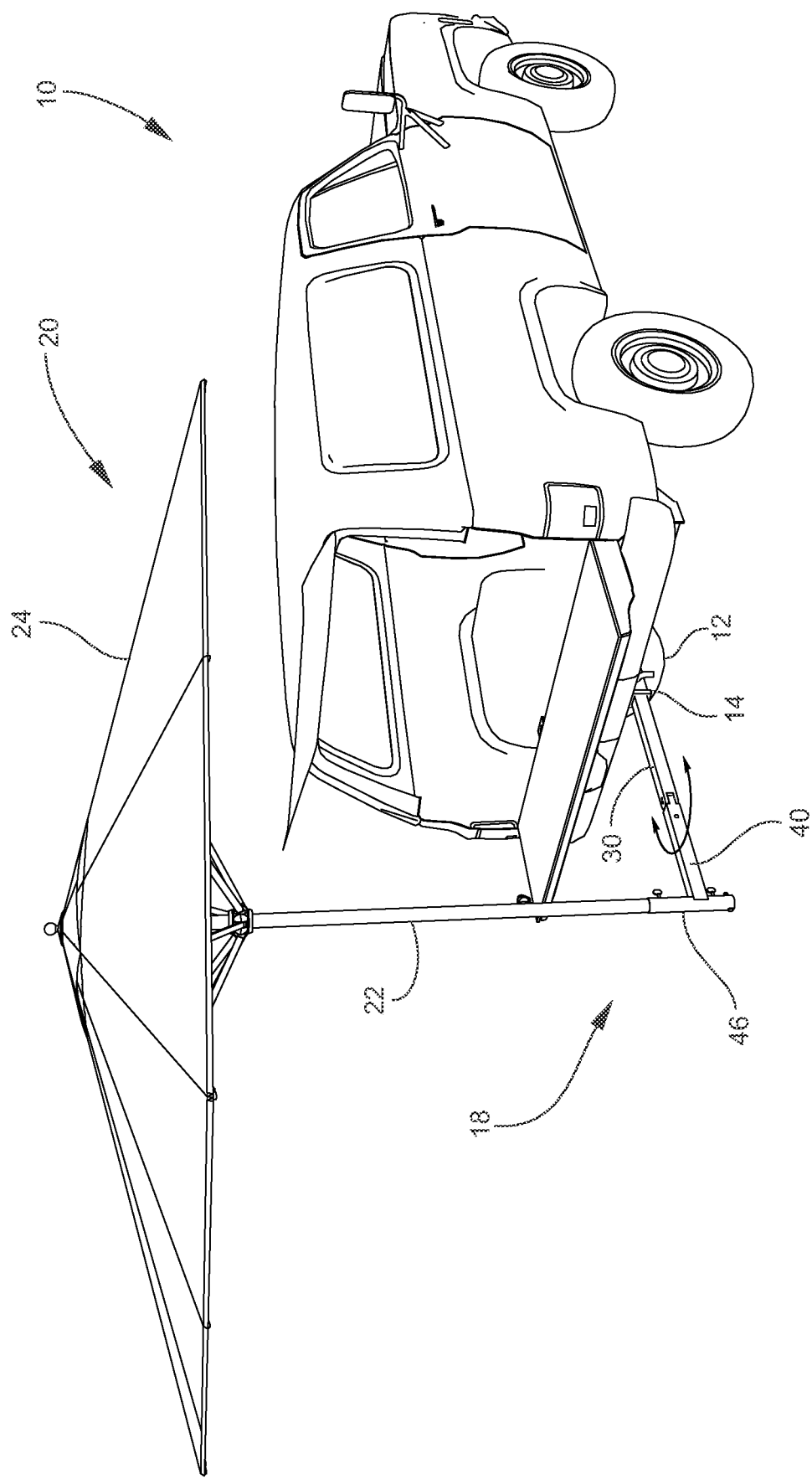
FIG. 1A is an illustration of an umbrella assembly coupled to a vehicle.

The following discussion of the embodiments of the disclosure directed to an umbrella connection assembly for securing an umbrella to a vehicle hitch is merely exemplary in nature, and is in no way intended to limit the disclosure or its applications or uses. The following description provides examples of the assemblies, devices, methods of making, and methods of using one or more inventions, and is not intended to limit the scope, application, or uses of any specific invention claimed in this application.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

Figure 1B:
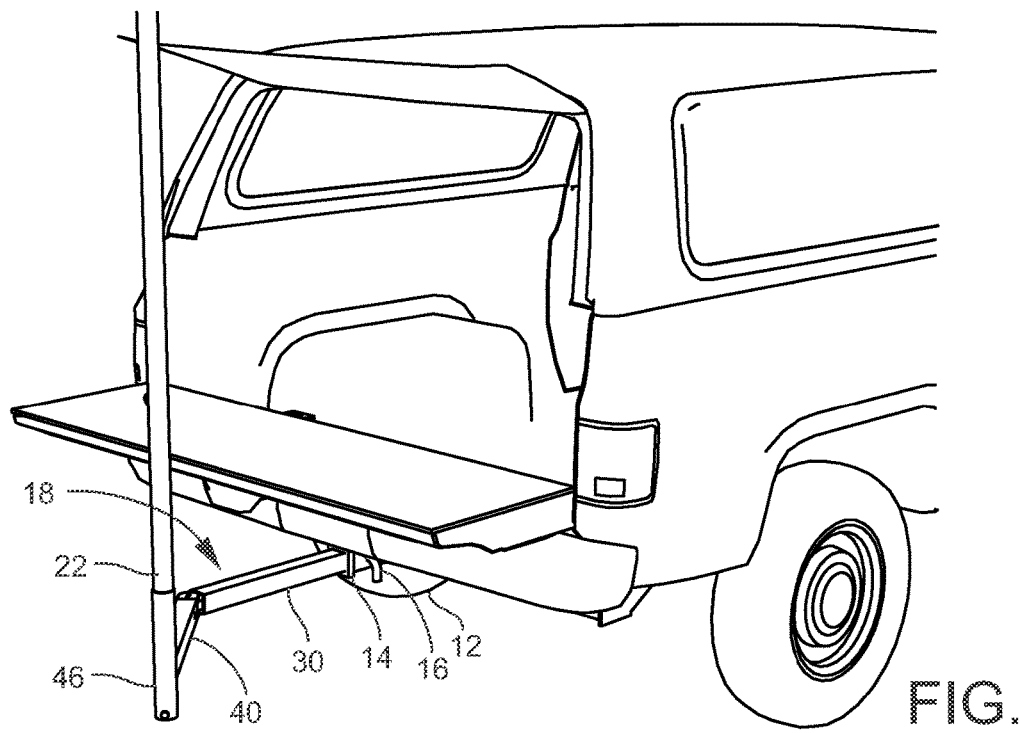
FIG. 1B is an illustration of an umbrella assembly coupled to a vehicle at a first angle.
Figure 1C:
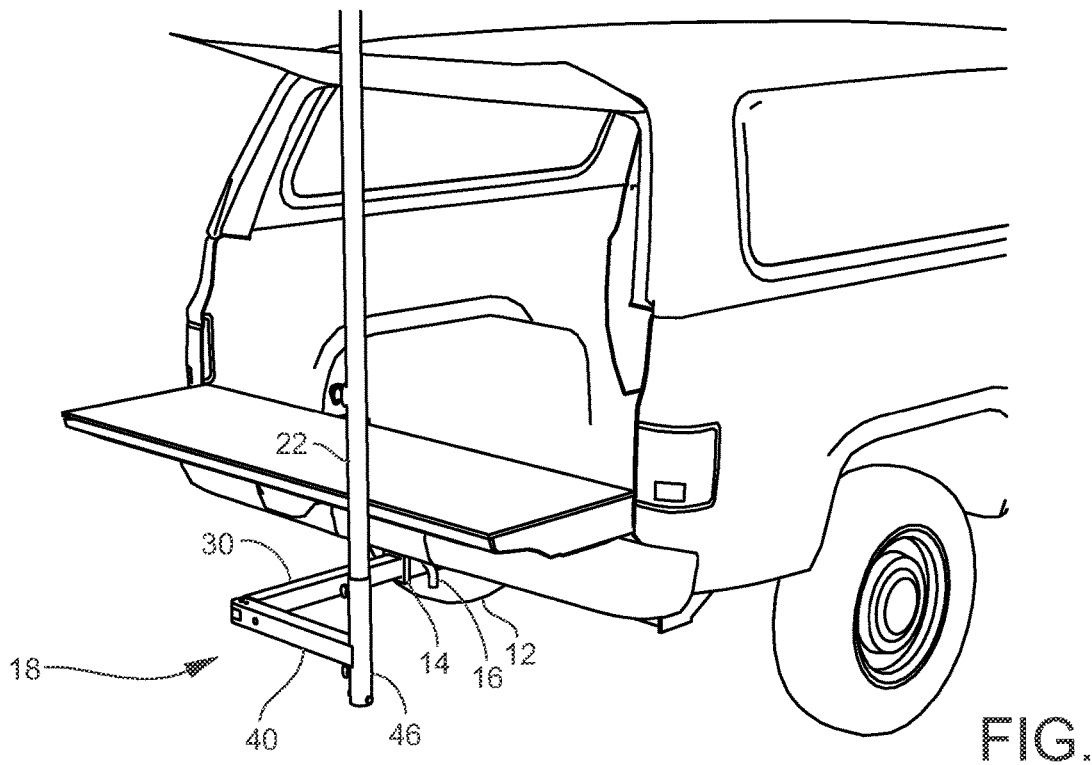
FIG. 1C is an illustration of an umbrella assembly coupled to a vehicle at an approximately perpendicular angle.

FIG. 1 is an illustration of a vehicle 10 that includes a towing hitch 12 secured to the vehicle. The towing hitch 12 includes a square hitch tube 14 that is designed to accept a square tube associated with a ball mount (not shown) having a ball to which, for example, a trailer towing tongue can be coupled to by a hitch pin 16. The hitch 12 is intended to represent any hitch operable to be connect to a towing tongue of a towed object (not shown). An umbrella connection assembly 18 is coupled to the hitch 12. An umbrella 20 having a support post 22 and a canopy 24 is coupled to the assembly 18 opposite to the hitch 12. The assembly 18 can be rotated to change the orientation of the umbrella 20 relative to the vehicle 10 to provide protection from the sun and rain from multiple directions relative to the vehicle 10.

Figure 2:
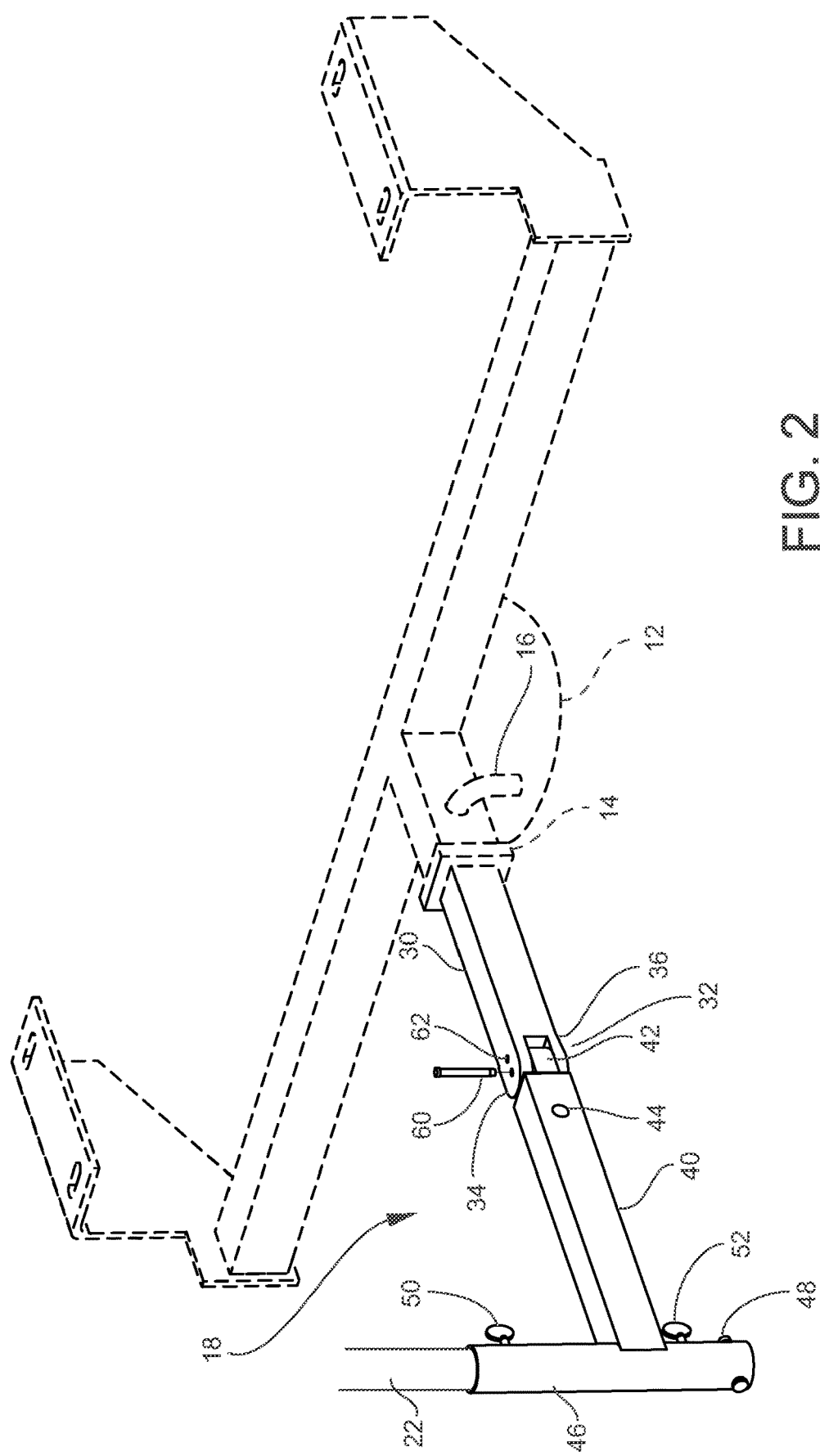
FIG. 2 is an isometric view of the umbrella coupling assembly.
Figure 3:
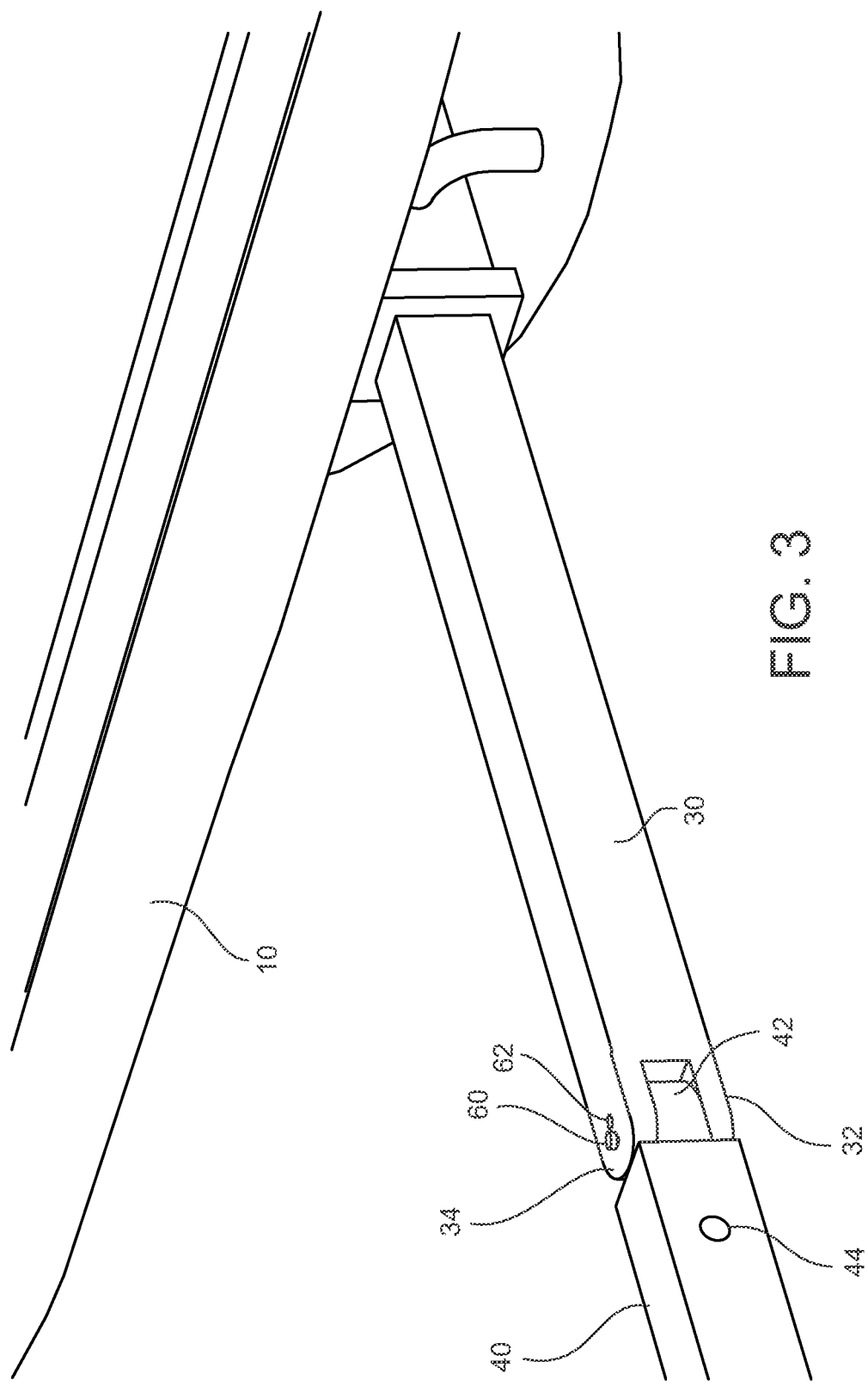
FIG. 3 is an isometric view of a portion of the umbrella coupling assembly illustrating an axle pin in place.
Figure 4:
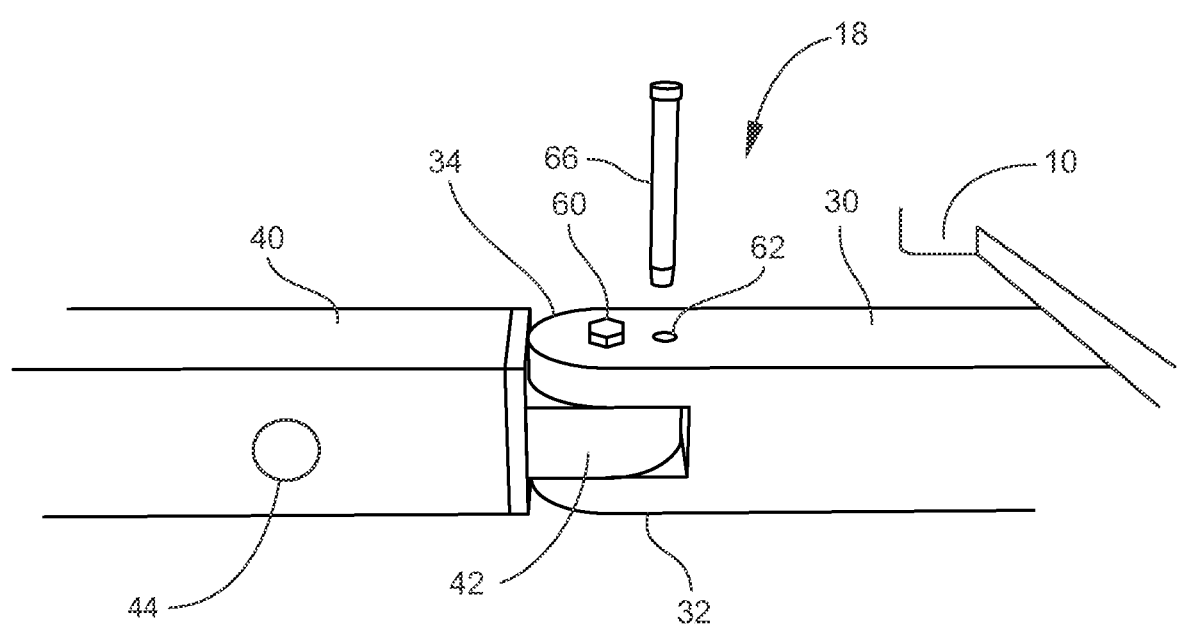
FIG. 4 is an isometric view of a portion of the umbrella coupling assembly illustrating a locking pin being inserted.

FIGS. 2-4 show various isometric views of the umbrella connection assembly 18. The assembly 18 includes a single-piece, square tubular hitch arm 30 that is inserted into the hitch tube 14 at one end in the same manner as the ball mount and includes a hitch pin aperture (not shown) that accepts the hitch pin 16. An opposite end of the hitch arm 30 includes a forked knuckle 32 having opposing tabs 34 and 36. The assembly 18 also includes a single piece square tubular support arm 40 having a protrusion 42 at one end, where the arms 30 and 40 are generally oriented parallel to the ground.

Figure 5:
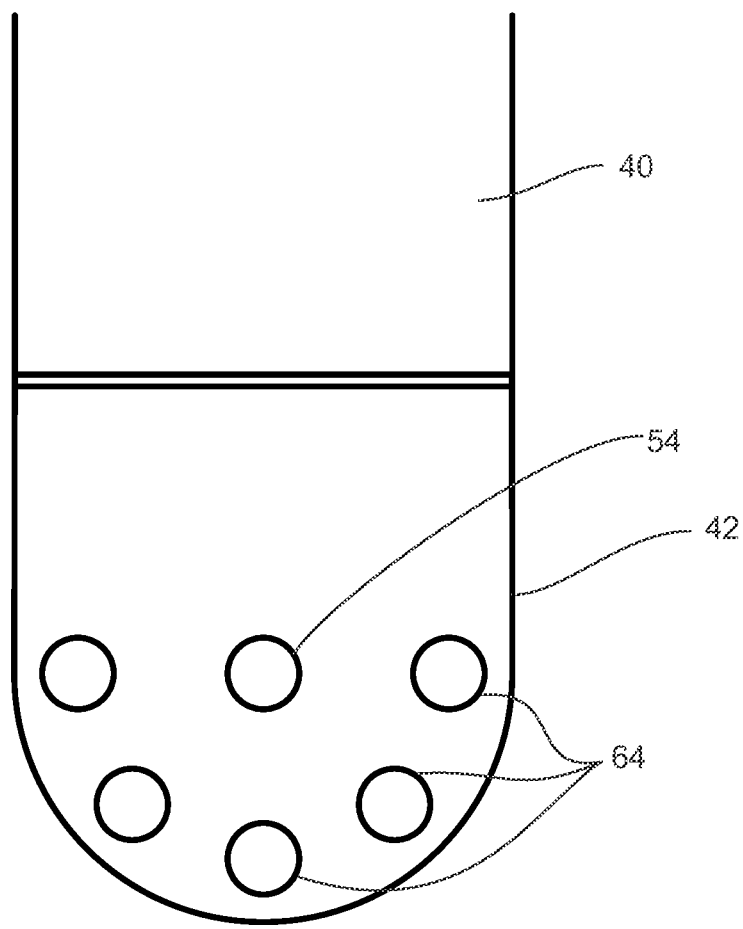
FIG. 5 is a top view of a protrusion associated with an arm of the umbrella coupling assembly showing an axle pin aperture and a series of locking pin apertures.

FIG. 5 is a top view of the end of the arm 40 having the protrusion 42. A hitch pin aperture 44 is provided in the arm 40 for holding the hitch pin 16 when the assembly 18 is not coupled to the hitch 12. Some embodiments can include a plurality of hitch pin apertures 44 formed in the sidewalls of the tubular support arm 40 to allow various accessories to be secured to the support arm 40, including, but not limited to, grills, coolers, or toolboxes.

The assembly 18 also includes a circular tubular umbrella holder arm 46 rigidly coupled to an end of the support arm 40 opposite to the protrusion 42 so that the arm 46 is generally perpendicular to the support arm 40. The umbrella holder arm 46 includes an umbrella post stop 48. The umbrella post stop 48 can be a pin or threaded fastener that extends through the interior of the umbrella holder arm 46 to prevent vertical translation of the umbrella post 22 through the bottom of the arm 46. In other embodiments, the post stop 48 can be a plate or cover that is secured to the bottom end of the umbrella holder arm 46 or that extends through the interior of the umbrella holder arm 46 to prevent vertical translation of the umbrella post 22. The umbrella post 22 is inserted into the umbrella holder arm 46 so that it rests on the post stop 48. The umbrella post 22 can be secured within the umbrella holder arm 46 by screws 50 and 52 threaded through the arm 46 that frictionally engage the umbrella post 22 to apply pressure that holds the umbrella post 22 securely within the arm 46.

The protrusion 42 is inserted between the tabs 34 and 36 so that an axle pin aperture 54 in the protrusion 42 aligns with axle pin apertures (not shown) in the tabs 34 and 36. An axle pin 60 is inserted through the pin apertures to secure the arms 30 and 40 together in a manner that allows the arm 40 to rotate relative to the arm 30. The tabs 34 and 36 include an axial locking pin aperture 62. The protrusion 42 includes a series of locking pin apertures 64. The example embodiments shown in the attached figures include five rotational locking pin apertures 64 arranged in a semicircle about the protrusion 42. Those of skill in the art will appreciate that the number, orientation, and spacing of the rotational locking pin apertures 64 can be varied to provide various degrees movement of the support arm 40 relative to the hitch arm 30—e.g., more or less than 180 degrees of movement and movement through various increments or rotation.

The axial locking pin aperture 62 and one of the rotational locking pin apertures 64 are aligned and a rotational locking pin 66 is inserted therethrough to fix the orientation of the arm 40, and thus the umbrella 20, relative to the arm 30 so that the umbrella 20 can be positioned at different orientations. The rotational locking pin 66 and the axel pin 60 can be cotter pins that utilize a separate clip that extends through the pin to hold the pin within the axle pin aperture 54 or the rotational locking pin apertures 64. In other embodiments, the rotational locking pin 66 and the axel pin 60 can be spring-loaded pins that include a spring-loaded ball bearing disposed within the pin that extends outward from the pin to lock the pin in place when the pin is disposed within an aperture.

Figure 6A:
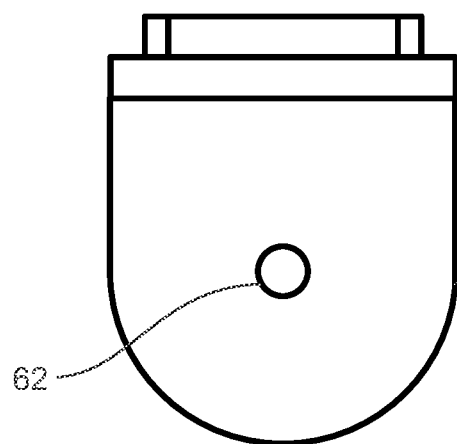
FIG. 6A shows a top view of one component of an assembly knuckle, including two tabs that accommodate a protrusion.
Figure 6B:
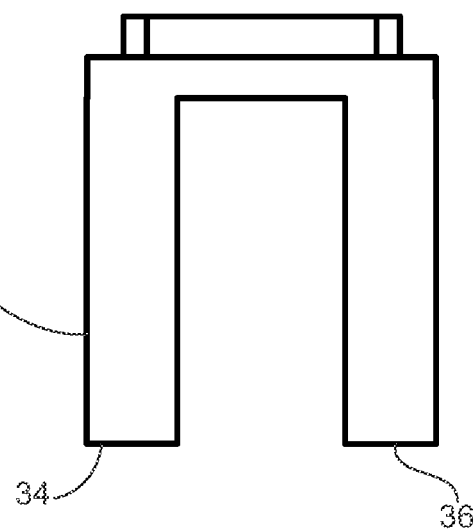
FIG. 6B shows a side view of one component of an assembly knuckle, including two tabs that accommodate a protrusion.
Figure 6C:
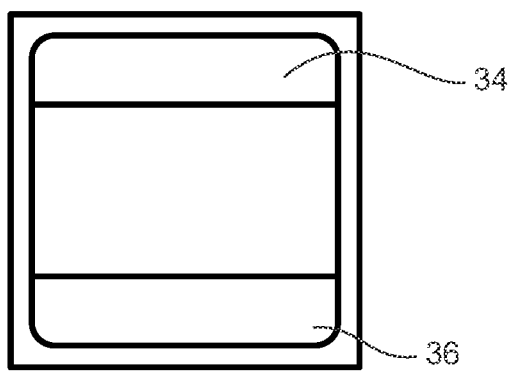
FIG. 6C shows a front view of one component of an assembly knuckle, including two tabs that accommodate a protrusion.
Figure 7A:
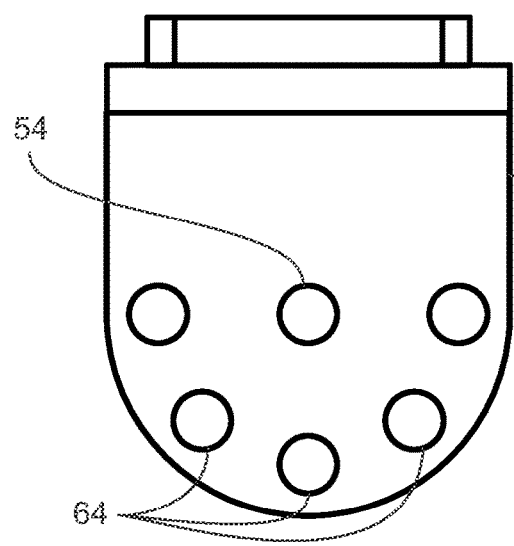
FIG. 7A shows a top view of a second component of the assembly knuckle, including a protrusion that can be secured within the tabs.
Figure 7B:
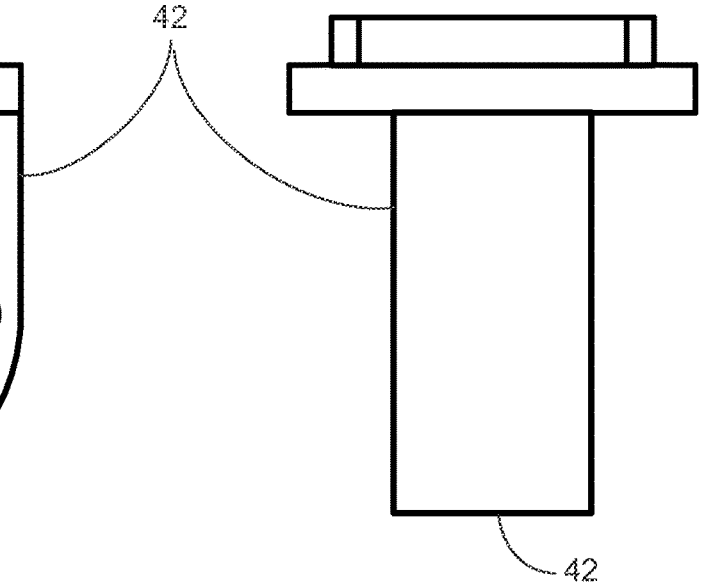
FIG. 7B shows a side view of a second component of the assembly knuckle, including a protrusion that can be secured within the tabs.
Figure 7C:
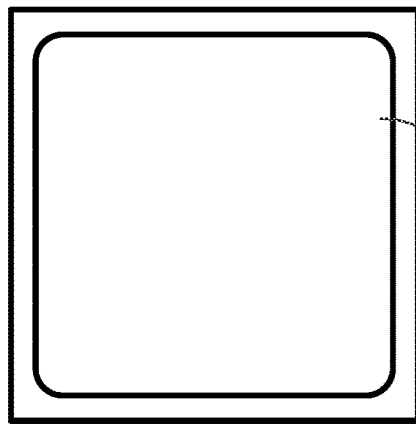
FIG. 7C shows a front view of a second component of the assembly knuckle, including a protrusion that can be secured within the tabs.

FIGS. 6-7 illustrate dimensions for an example embodiment of the knuckle 32, which is formed from the protrusion 42 and the tabs 34 and 36. The outer dimensions of the knuckle components 32 are the same or smaller than the outer dimensions of the tubular hitch arm 30 and the support arm 40 so that both arms 30 and 40 and can fit within the hitch tube 14. This allows either component to be stowed in the hitch tube 14 when not in use, and it allows the hitch arm 30 to be removed and the support arm 40 to be directly inserted into the hitch tube 14 to shorten the length of the assembly 18 such that the umbrella is closer to the vehicle 10. In such a configuration, the hitch pin 16 can be inserted through the hitch pin apertures 44 to secure the support arm 40 to the vehicle hitch 12.

In one non-limiting embodiment, the arms 30 and 40 and the support arm 46 are made of aluminum. The components of the assembly 18 can be coated with a corrosion resistant coating to enhanced durability.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An umbrella connection assembly for coupling an umbrella to a hitch on a vehicle comprising:
   (a) a first arm having one end operable to be coupled to a hitch and a second end comprising a forked knuckle, wherein
       (i) the forked knuckle comprises opposing tabs that define a space between the tabs, and
       (ii) the tabs each comprise an axle pin aperture and a rotational locking pin aperture;
   (b) a second arm comprising a protrusion at one end that is positioned in the space between the opposing tabs, wherein the protrusion comprises an axle pin aperture and a plurality of rotational locking pin apertures including at least five rotational locking pin apertures;
   (c) an axle pin inserted in the axle pin apertures in the tabs and the axle pin aperture in the protrusion such that the second arm is rotatable relative to the first arm;
   (d) a rotational locking pin, wherein
       (i) the rotational locking pin is adapted to be inserted through the rotational locking pin apertures in the tabs and one of the rotational locking pin apertures in the protrusion when the rotational locking pin apertures in the tabs are aligned with one of the rotational locking pin apertures in the protrusion, and wherein
       (ii) when the rotational locking pin is inserted through the rotational locking pin apertures in the tabs and the rotational locking pin aperture in the protrusion, the second arm is locked into a given orientation relative to the first arm; and
   (e) a third arm coupled to a distal end of the second arm opposite to the protrusion, wherein the third arm (i) is generally perpendicular to the second arm, and (ii) is configured to receive a post of an umbrella.

2. The umbrella connection assembly of claim 1 wherein the plurality of rotational locking pin apertures in the protrusion are arranged in a semicircle about the axle pin aperture.

3. The umbrella connection assembly of claim 1, wherein each rotational locking pin aperture in the protrusion is aligned at a given orientation relative to the locking pin apertures in the tabs when the protrusion is positioned in the space between the tabs.

4. The umbrella connection assembly of claim 1, wherein the first arm and second arm are elongated tubular bodies with a squared cross section.

5. The assembly of claim 4, wherein the third arm is an elongated tubular arm with a circular cross section.

6. The umbrella connection assembly of claim 5, wherein the third arm comprises a post stop proximal to a lower end of the third arm, and wherein the post stop is configured to support the umbrella.

7. The umbrella connection assembly of claim 6, wherein the post stop comprises either a plate secured to the third arm or an elongated fastener that extends through the third arm.

8. The umbrella connection assembly of claim 1 wherein the first arm is configured to receive a hitch pin.

9. The umbrella connection assembly of claim 8 wherein the second arm includes a hitch pin aperture configured to hold the hitch pin when the assembly is not coupled to the vehicle.

10. An umbrella connection assembly comprising:
    (a) a first elongated tubular body having a first end and a second end opposite the first end, wherein
        (i) the second end comprises a forked knuckle,
        (ii) the forked knuckle comprises opposing tabs that define a space between the tabs, and
        (iii) the tabs each comprises an axle pin aperture and a rotational locking pin aperture;
    (b) a second elongated tubular body comprising a distal end and a coupling end, wherein
        (i) the coupling end comprises a protrusion, (ii) the protrusion is positioned in the space between the opposing tabs, (iii) the protrusion comprises a plurality of rotational locking pin apertures arranged in a semicircle about the axle pin aperture, and (iv) second elongated tubular body is rotatable relative to the first elongated tubular body;

(c) a rotational locking pin, wherein (i) the rotational locking pin is adapted to be inserted through the rotational locking pin apertures in the tabs and one of the rotational locking pin apertures in the protrusion when the rotational locking pin apertures in the tabs are aligned with one of the rotational locking pin apertures in the protrusion, and wherein (ii) when the rotational locking pin is inserted through the rotational locking pin apertures in the tabs and the rotational locking pin aperture in the protrusion, the second elongated tubular body is locked into a given orientation relative to the first elongated tubular orientation; and (d) a third elongated tubular body coupled to a distal end of the second elongated tubular body, wherein the third elongated tubular body (i) is generally perpendicular to the second elongated tubular body, and (ii) is configured to receive a post of an umbrella.

11. The umbrella connection assembly of claim 10 wherein the first arm is configured to receive a hitch pin.

12. The umbrella connection assembly of claim 10 comprising at least five rotational locking pin apertures in the protrusion.

13. The umbrella connection assembly of claim 12 wherein each rotational locking pin aperture in the protrusion is aligned at a given orientation relative to the locking pin apertures in the tabs when the protrusion is positioned in the space between the tabs.

14. The umbrella connection assembly of claim 13 wherein the third arm comprises a post stop proximal to a lower end of the third arm, and wherein the post stop is configured to support the umbrella.

15. The umbrella connection assembly of claim 14 wherein the post stop comprises either a plate secured to the third arm or an elongated fastener that extends through the third arm.

16. An umbrella connection assembly for coupling an umbrella to a hitch on a vehicle comprising:

(a) a first arm having a first end operable to be coupled to a hitch and a second end comprising a forked knuckle, wherein (i) the forked knuckle comprises opposing tabs that define a space between the tabs, and (ii) the tabs each comprise an axle pin aperture and a rotational locking pin aperture;

(b) a second arm comprising a protrusion at a coupling end, wherein (i) the protrusion is positioned in the space between the opposing tabs, (ii) the protrusion comprises an axle pin aperture and at least five rotational locking pin apertures, (iii) the plurality of rotational locking pin apertures in the protrusion are arranged in a semicircle about the axle pin aperture, and (iv) each rotational locking pin aperture in the protrusion is aligned at a given orientation relative to the locking pin apertures in the tabs when the protrusion is positioned in the space between the tabs;

(c) an axle pin inserted in the axle pin apertures in the tabs and the axle pin aperture in the protrusion such that the second arm is rotatable relative to the first arm;

(d) a rotational locking pin, wherein (i) the rotational locking pin is adapted to be inserted through the rotational locking pin apertures in the tabs and one of the rotational locking pin apertures in the protrusion when the rotational locking pin apertures in the tabs are aligned with one of the rotational locking pin apertures in the protrusion, and wherein (ii) when the rotational locking pin is inserted through the rotational locking pin apertures in the tabs and the rotational locking pin aperture in the protrusion, the second arm is locked into a given orientation relative to the first arm; and (e) a third arm coupled to a distal end of the second arm opposite to the protrusion, wherein the third arm (i) is generally perpendicular to the second arm, and (ii) is configured to receive a post of an umbrella.

17. The umbrella connection assembly of claim 16, wherein:

(a) the third arm further comprises a post stop, and (b) the post stop is formed as either a plate secured to a lower end of the third arm or an elongated fastener that extends through the lower end of the third arm.

18. The umbrella connection assembly of claim 16, wherein the rotational locking pin is a spring-loaded pin.

* * * * *